Fig_1

INVENTOR.
NICKOLAS J. SIDARIS

United States Patent Office 3,045,993
Patented July 24, 1962

3,045,993
DRYER CONTROL SYSTEM
Nickolas J. Sidaris, Long Beach, Calif., assignor to Minneapolis-Honeywell Regulator Company, Minneapolis, Minn., a corporation of Delaware
Filed Dec. 30, 1959, Ser. No. 862,850
14 Claims. (Cl. 263—10)

This invention relates to a control system and apparatus for dryers and, more particularly, to a control system and apparatus for clothes dryers. While this system may be used on electric dryers as well as gas dryers, the invention will be described as being applied to a gas heated clothes dryer.

There are many dryers on the market which utilize timers for controlling their operation. It is usual for the timer to be manually set, depending upon the size of the load and the degree of wetness of the clothes being dried, it being a hit and miss determination of the drying time by the operator. Usually the operator sets the timer to have the dryer operate a longer period of time than need be just to assure that the clothes are dry when the timer cuts the dryer off. This is very wasteful and possibly is injurious to the clothes.

Prior art attempts to control the drying time of dryers in response to a humidity sensing element in the exhaust of the dryer, have proven to be unsatisfactory, mainly because of the cost of a reliable humidity sensing unit.

It is an object of this invention to provide a control system and apparatus for a dryer that will automatically determine the drying time so as to provide a certain degree of dryness as selected by the operator of the dryer.

It is another object of the invention to provide a control system and apparatus for a dryer wherein the heat to the dryer is regulated by a temperature responsive control, positioned to sense the temperature of air being exhausted from the dryer, in conjunction with a timer that provides a fixed drying time for operation of the dryer after a certain degree of dryness has been reached in the material in the dryer, as determined by a control responsive to the heat input to the dryer reducing to a certain predetermined level.

A further object of the invention is to provide control means for a dryer embodying a timer and means for sensing the heat input to a dryer for controlling the cutoff time for a dryer for a selected degree of dryness of the material being dried.

Figure 1:
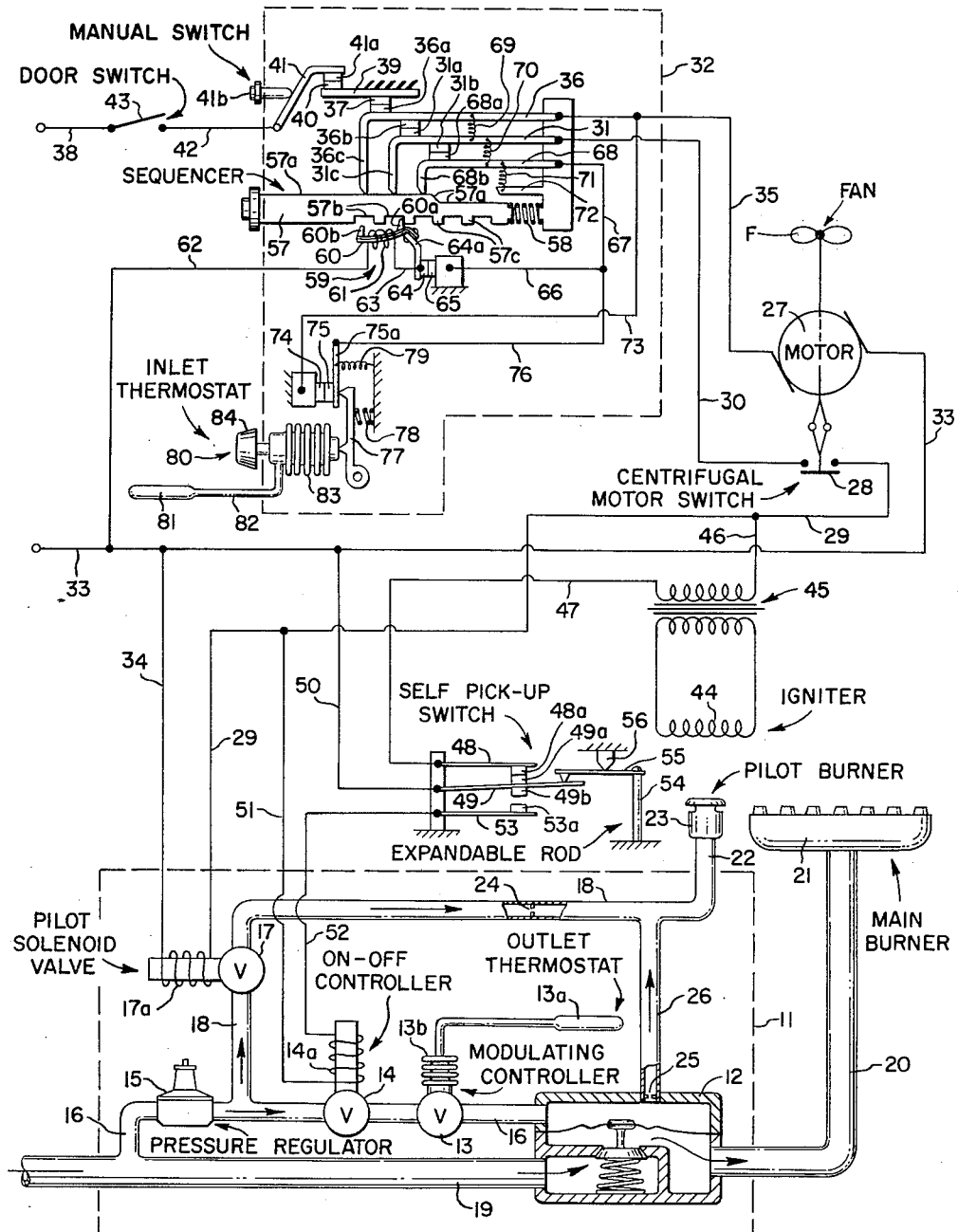
Figure 2:
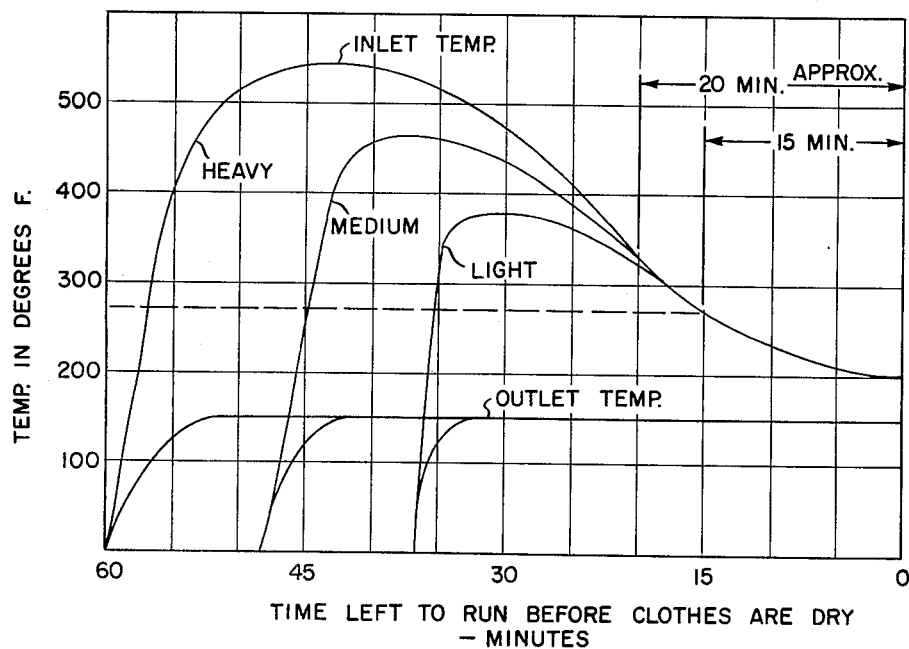
Figure 3:
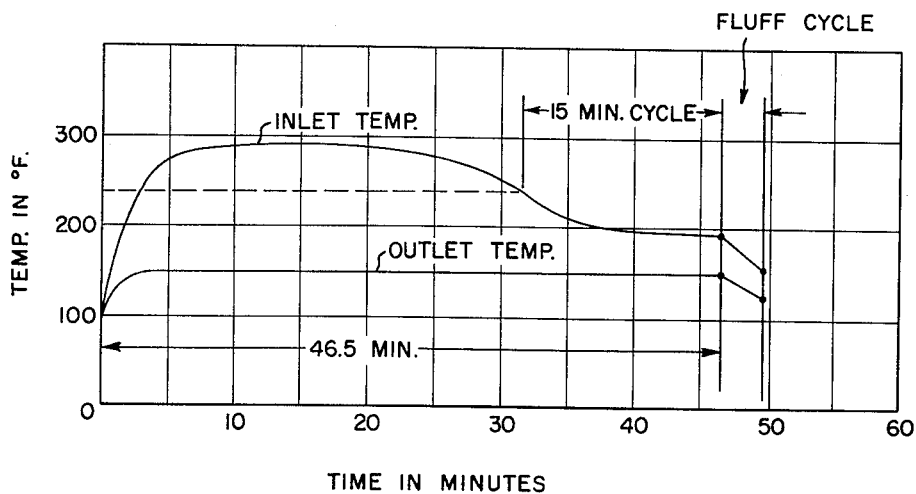

Other objects of the invention will become apparent upon reading the following detailed description of the invention in conjunction with the accompanying drawing wherein:

FIGURE 1 is a schematic showing of the invention;
FIGURE 2 is a graph showing the drying time and operating temperatures of a dryer for heavy, medium and light loads; and
FIGURE 3 is a graph showing the operating time and temperatures of a drying cycle with a fluff cycle added to the end of the drying cycle.

Referring to FIGURE 1 of the drawing, the reference numeral 11 generally designates a manifold valve comprising a diaphragm valve 12, a modulating controller valve 13, an electrically operated on-off controller valve 14 in series with the modulating controller valve, a pressure regulator valve 15 upstream of the valves 14 and 13 and in a common control gas supply line 16, and an electrically operated pilot valve 17 in a pilot gas supply passage 18 branching off of the control gas passage 16 downstream of the regulator valve 15. A supply pipe 19 is connected to the inlet side of the diaphragm valve 12 while a main burner supply pipe 20 connects the outlet of the valve 12 to a main burner 21. The main burner is the heat source for the dryer in this particular modification of the invention. A pilot burner supply pipe 22 connects to the pilot gas passage 18 and leads to a pilot burner 23 positioned adjacent the main burner 21. The rate of gas flow to the pilot burner is determined by an orifice member 24 positioned somewhere in the passage 18. Control gas from the pressure chamber of the valve 12 is bled off to the pilot burner 23 through an orifice 25 and bleed passage 26 through its connection with the passage 18 downstream of the orifice 24.

The modulating controller valve is operated by a bulb 13a positioned somewhere in the dryer so as to sense the temperature of the air being exhausted from the dryer, and a bellows 13b, which is adapted to variably position the modulating valve in response to the degree of heating of the bulb 13a, so as to supply gas to the pressure chamber of the diaphragm valve at a higher rate as the bulb 13a cools and to supply gas at a lower rate as the bulb 13a heats up. It is obvious that no gas can flow to the pressure chamber of the valve 12 unless the on-off controller valve 14 is energized to have its valve open.

A fan "F," for circulating air through the dryer, is driven by a motor 27 which also drives a centrifugal switch 28 which, in turn, is connected through line 29 to one end of a coil 17a of pilot valve 17 and connected through line 30 to a movable contact arm 31 of a timer, generally designated by the reference numeral 32. The other end of the coil 17a is connected to electric supply line 33 through line 34. The supply line 33 leads directly to one side of the motor 27 while the other side of the motor is connected through line 35 to a movable contact arm 36 extending substantially parallel with the contact arm 31. A contact 36a on contact arm 36 is adapted to engage fixed contact 37 which, in turn, is connected to the other supply line 38 through contact bar 39, fixed contact 40, movable contact 41a, contact arm 41, line 42 and door switch 43.

Movable contact arm 31 is electrically connected to the other line 38 by having a movable contact 31a thereon engage a movable contact 36b on the underside of the arm 36. It is thus seen that when the motor is energized and is at operating speed, closing switch 28, the pilot valve is energized to supply gas to the pilot burner.

To provide for ignition of the pilot burner, in the event a standing pilot is not used, an igniter 44 is energized whenever the primary coil of a transformer 45 is energized. The transformer is connected in parallel with the pilot valve through a line 46 connected to line 29 and a line 47 connected to a fixed contact arm 48, a movable contact arm 49 and a line line 50 connected to the line 33. As illustrated, a fixed contact 48a is engaging a movable contact 49a when the arm 49 is in its elevated position, due to its inherent bias.

The on-off controller valve 14 is also electrically connected in parallel with the valve 17 by having one end of its coil 14a connected through line 51 to line 29 and the other end of its coil connected through line 52 to a fixed contact arm 53, fixed contact 53a and movable contact 49b attached to the underside of the movable contact arm 49. This parallel circuit can be completed only by a flame being present at the pilot burner so as to heat an expandable rod 54 positioned adjacent to pilot burner, so as to rotate a lever 55 counterclockwise about a fixed pivot 56. This moves the arm 49 away from the arm 48, and to bring contact 49b into engagement with contact 53a. When the arm 49 so moves, the circuit to the igniter is broken and the on-off controller valve is energized placing the diaphragm valve under the control of the modulating controller valve.

The contact arms 36 and 31 are moved into switch closing positions by means of a manually operable cam member or bar 57 against the bias of compression spring 58 by having a cam surface 57a sequentially engage downwardly extending arms 36c and 31c on the arms 36 and 31, respectively, which cam lifts the arms so that contact 36a engages contact 37 and contact 31a engages contact 36b. They are held in this position by the upwardly stepped top surface 57a which is parallel to the longitudinal axis of the member 57. The lower edge of the member 57 has a plurality of notches 57b therein providing a plurality of teeth 57c therebetween. These teeth are adapted to be engaged by an escapement mechanism generally designated by the reference numeral 59.

The escapement mechanism may take a number of forms but, for illustration purposes, it is schematically shown as consisting of a bimetallic member 60 which is adapted to be heated by an electric heater 61. One end of the heater 61 is connected by line 62 to the power line 33 while the other end of the heater is connected by line 63 to a movable contact 64, fixed contact 65 and line 66 to line 67 which, in turn, is connected to a movable contact arm 68 carrying a movable contact 68a and movable contact 31b on the movable contact arm 31, which is connected to the other power line 38 as described above. The contact 64 is carried by a movable contact arm 64a riveted or otherwise secured to one end of the bimetal 60. The bimetal is so mounted that an escapement tooth 60a is normally in the position to engage the left side of one of the teeth 57c on the cam member 57. When the bimetal is heated, it will cause the toothe 60a to move out of registration with the adjacent tooth 57c while simultaneously moving a second tooth 60b inwardly of the lower surface of the teeth 57c so that as the tooth 60a disengages from the abutting tooth 57c, the spring 58 can move the cam bar to the left into engagement with the tooth 60b. The mounting of the arm 64a is such that as the tooth 60a moves clear of the abutting tooth 57c, the contact 64 is separated from contact 65 so as to cause deenergization of the heater 61. Then as the heater 61 cools off, the bimetal will cause the teeth 60b and 60a to move counterclockwise so as to position the tooth 60a inwardly of the lower edge of the teeth 57c and to move the tooth 60b out of engagement with the abutting tooth 57c. In this way the cam bore 57 will inch its way to the left by the alternate heating and cooling of the bimetal member to provide a timed operation of the switches controlled by the cam bore 57.

It is to be noted that the movable arm 68 has a downwardly projecting arm 68b that is also cammed upwardly to place contact 68a into engagement with contact 31b when the cam bar 57 is moved to its innermost position, which completes the circuit to the heater 61 of the escapement mechanism.

While the movable contact arms 36, 31 and 68 could move counterclockwise by their own weight as the surface 57a moves out from under them, it is preferable to have these arms biased in this direction by means of springs 69, 70 and 71, respectively. Spring 69 connects arms 36 and 31 and is weaker than the spring 70 connecting arms 31 and 68 which, in turn, is weaker than the spring 71 which connects arm 68 to a fixed arm 72. It will be noted that as the cam 57 moves to the left as viewed in FIGURE 1 of the drawing, arm 68 will be the first to be freed to move downwardly to break contacts 31b and 68a, followed by the breaking of contacts 31a and 36b and then by contacts 36a and 37. However, when contacts 68a and 31b are separated, the circuit to the bimetal heater is broken and the movement of the cam bar 57 is stopped.

There is another shunt circuit around the contacts 31b and 68a which consists of a line 73 connected to the contact bar 39 and a fixed contact 74, a movable contact 75 and a line 76 connected to line 66. The contacts 74 and 75 are normally closed by a lever 77 which is biased against the movable contact lever 75a by means of a compression spring 78. A tension spring 79 normally causes the contact arm 75a to follow the movement of the lever 77.

A manually adjustable thermostat 80 has a bulb 81 that is adapted to be positioned at a point in the dryer so as to sense the heat input to the dryer. Normally this bulb is positioned somewhere in the inlet duct leading to the dryer's drum. The bulb is connected by a capillary tube 82 to a bellows 83 which, in turn, is positioned to engage the lever 77 so as to move the lever 77 sufficiently to break the contacts 74 and 75 at a preselected level of heat input to the dryer. The amount of heat input could be determined by either the position of a control valve, in a gas dryer, or the position of a rheostat, in an electric dryer, or may be determined by the temperature of the air entering the dryer, or by some other parameter which would indicate heat input. In this particular instance, the heat input is determined by a temperature sensing bulb and bellows of conventional construction wherein the fixed end of the bellows 83 may be adjusted by a control knob 84 so that when the inlet air reaches a temperature of 250° F., for example, the contacts 74 and 75 will be broken so that when the contacts 31 and 68 are subsequently broken, the timer will stop operating until the contacts 74 and 75 are closed by the inlet temperature reducing to a level below the control point of the thermostat 80. The closing of the contacts 74 and 75 will then cause the timer to continue to run until the contacts 31a, 36b and 36a and 37 are broken by the surface 57a moving out from under the arms 31c and 36c.

*Operation*

The apparatus and control system is illustrated as being in the condition of having the manual switch closed, the sequencer cam member 57 in its innermost position and the door switch open indicating that the door of the dryer is still open. In this condition of the apparatus, all that is necessary to place the dryer into operation, is to close the door of the dryer. With the closing of the door switch, a circuit will be completed to the motor 27, the pilot solenoid valve 17 and the igniter 44 through the circuits described above. Gas will start to flow to the pilot burner 23 where it is ignited by the hot wire igniter 44.

Upon the pilot burner becoming ignited, the rod 54 of the self-pick-up switch will expand and move the contact arm 49 from contact 48a and into engagement with the contact 53a. This breaks the circuit to the igniter and completes a circuit to the on-off controller for the diaphragm valve through the centrifugal motor switch 28, which has been closed by operation of the motor, through the circuits described above.

As the temperature surrounding the bulb 13a is initially at room temperature, a temperature at which the controller valve is open, gas will immediately flow to the main burner due to the fact that control gas will immediately flow to the pressure chamber of the diaphragm valve to move it to its open position. The air flowing into the dryer will quite quickly heat up and cause the fluid in the bulb 81 of the inlet thermostat to expand and cause the bellows 83 to open the contacts 74—75.

The timer, which started operating when the door switch was closed, continues to operate by current flowing through the heater of the timer through contacts 31b and 68a. While it would be possible to stop the timer operation solely through the contacts 74 and 75, it is preferable to have the timer cut off after its initial starting by means of the contacts 31b and 68a so that the remaining time for the timer to run after it has again been started will be a fixed time. Therefore, it is only necessary that the sequencer cam member 57 allow only sufficient time for the contacts 74 and 75 to be broken by the inlet thermostat and to thereafter break the contacts 31b and 68a by having the cam surface 57a pass under the arm 68b. If, for example, a 20-minute timer were used, the contacts 31b and 68a could be set to break two minutes after the dryer was started.

The dryer will then continue to operate under the control of the modulating controller which responds to outlet temperature to maintain the outlet temperature at a desired operating level, for example, 150° F. as illustrated in FIGURES 2 and 3 of the drawing. It will be noted from the graphs that the inlet temperature will immediately rise to a fairly high level as compared to the outlet temperature. However, as the drying takes place, less and less heat input is required to maintain the uniform outlet temperature. Therefore, as the heat input decreases, the inlet temperature will decrease. It will also be noted that for heavy loads the inlet temperature will rise to a higher level than for medium and light loads. It will also be noted that the amount of time required to bring the material being dried to a uniform degree of dryness decreases with the lightening of the load.

The dryer will continue to run with a gradually decreasing amount of heat input to the dryer until a heat input level is reached (approximately 270° F. at the inlet thermostat for the drying setting indicated in FIGURE 2 or 240° F. inlet temperature as indicated for the setting in FIGURE 3). It will be noted that in each instance the control point of the inlet thermostat is selected on a fairly steep portion of the inlet temperature curve and at a point or level below which all of the inlet temperature curves for the light, medium and heavy loads come together. This means that regardless of the loading in the dryer, the control apparatus will automatically adjust the drying time so as to cause the clothes to obtain a uniform drying as selected by the operator. In other words, this control system takes the guesswork out of the time required to dry various batches of material, such as clothing.

When the inlet temperature causes the thermostat to close and start the timer running again, it will continue to run until contacts 31a and 36b are broken, shutting off the supply of gas to the burner, which time may arbitrarily be fixed at 15 minutes, by way of example, and until the contacts 37 and 36a are broken which shuts off the dryer motor and the timer, which would be 3 minutes. The 3-minute period is generally known as the fluff cycle wherein no heat is being supplied to the dryer but the drum of the dryer is being rotated to permit the temperature of the material being dried to drop to a handling temperature.

While I have described the preferred embodiment of the invention, it is to be understood that other types of timers, condition responsive means, fuel controls means, etc., may be substituted for the apparatus disclosed above without departing from the spirit of the invention. Therefore, the scope of the invention should be determined from the appended claims.

I claim as my invention:

1. In a dryer control system for a dryer having a heat source and means for moving hot air through the dryer, the combination comprising first means for varying the heat output of the heat source between a high output and a low output, temperature responsive means responsive to the temperature of exhaust air, means connecting said temperature responsive means to said first means whereby as the moisture is removed and less heat is needed said first means is adapted to reduce the heat output of the heat source, second means for terminating the operation of the heat source, a timer for controlling said second means, second temperature responsive means responsive to a predetermined level of output of the heat source and having contacts that are closed below said level and open above said level, and means connecting said second temperature responsive means to said timer so that said second temperature responsive means only determines the termination of operation of the dryer by providing a fixed time of operation of the dryer after the output of the heat source has reduced to a predetermined level to close said contacts.

2. In a dryer control system for a dryer having a heat source and means for moving hot air through the dryer, the combination comprising first means for varying the heat output of the heat source between a high output and a low output, temperature responsive means responsive to the temperature of exhaust air, means connecting said temperature responsive means to said first means whereby as moisture is removed and less heat is needed the output of said first means controlled by said temperature responsive means only is adapted to vary without cutting off the heat output of the heat source, second means for terminating the operation of the heat source, a timer for controlling said second means, second temperature responsive means responsive to a predetermined level of output of the heat source and having contacts that are closed below said level, and means connecting said second temperature responsive means to said timer to cause energization of said timer by said second temperature responsive means only when the output drops to said level to cause termination of operation of the dryer at a fixed time after the said level is reached.

3. The combination of claim 2 wherein said timer is manually operable to its "on" position and has a holding circuit switch connected to said timer in parallel with said second temperature responsive means for keeping the timer operating for a predetermined short time regardless of the condition of said second temperature responsive means to assure the dryer coming up to operating temperature above said predetermined level and then causing said timer to stop operating until said predetermined level is reached thereafter whereupon the timer will start and run the remainder of the drying time.

4. The combination of claim 3 wherein said timer also has switch means connected to said means for moving the air and to said first means for controlling operation of the means for moving the air and for operating said first means.

5. In a dryer, the combination comprising a fuel burner furnishing heat thereto, a modulating valve arranged to control the supply of fuel to the burner, means for circulating air through said dryer, a first temperature responsive means responsive to exhaust air temperature of the dryer, means connecting said first temperature responsive means to said modulating valve so that the burner heat output is gradually decreased as the temperature of the exhaust air increases, second temperature responsive means responsive to a temperature indicative of the output of the burner, control means for said valve for shutting off the flow of gas to the burner, and a timer for controlling said control means and controlled only by said second temperature of responsive means to initiate operation of the timer near the end of the drying cycle.

6. The combination of claim 5 wherein said timer has switch means for controlling operation of said control means and switch means for controlling said timer, said switch means for said control means being arranged to keep said control means energized after said switch means for the timer has opened.

7. The combination comprising drying apparatus having a source of heat for heating air flowing into said apparatus and means for exhausting the air from said apparatus, a timer having first switch means for controlling said heat source and second switch means for controlling said timer, and control means responsive to the heat input to the apparatus to control energization of said timer independently of said second switch means, said control means being arranged to cause energization of said timer only after the heat input to the apparatus has been relatively high and has dropped below a predetermined level, and said second switch means being arranged to break the circuit to said timer a short time after the timer is initially placed into operation, said time being sufficient to have the heat input rise above said predetermined level.

8. The combination defined in claim 7 wherein said timer is manually operable to start its operations.

9. Drying apparatus comprising a chamber, a source of heat for heating air flowing to said chamber, means for exhausting the air from said chamber after moisture is collected by the air, first means responsive to the temperature of exhaust air, said means being adapted to control the source of heat whereby the heat is reduced as the temperature of the exhaust air reaches a predetermined high limit, second means providing "on"-"off" control of the source of heat in addition to said first means, said second means being responsive to a parameter affected by the reduction of the heat from said source, and timer means controlled by said second means for providing a fixed terminal period of heat supply following said parameter lowering to a predetermined level.

10. The apparatus defined in claim 9 in combination with means responsive to the operation of said air exhausting means to also control said source of heat.

11. In a dryer, the combination comprising a fuel burner furnishing heat thereto, a modulating valve arranged to control the supply of fuel to the burner, means for circulating air through said dryer, a first temperature responsive means responsive to exhaust air temperature of the dryer, means connecting said first temperature responsive means to said modulating valve so that the burner heat output is gradually decreased as the temperature of the exhaust air increases, second temperature responsive means responsive to a temperature indicative of the output of the burner, control means for said modulating valve for shutting off the flow of gas to the burner, a timer for controlling said control means and controlled only by said second temperature responsive means to initiate operation of the timer near the end of the drying cycle, a pilot burner for said fuel burner, a pilot valve for supplying fuel to said pilot burner, an igniter for said pilot burner, both said pilot valve and said igniter being connected in parallel with said control means and in series with said timer, and a single pole double throw switch responsive to a pilot flame for selectively breaking the circuit of said control means or said igniter.

12. The combination of claim 11 wherein said timer also controls said means for circulating air.

13. The combination of claim 12 wherein the timer means also controls de-energization of said timer.

14. The combination of claim 13 wherein the timer is so arranged that circuits therethrough to the timer and to the valves and to the air circulating means and timer jointly are broken in that order by operation of said timer.

References Cited in the file of this patent

UNITED STATES PATENTS

| | | |
|---|---|---|
| 2,767,923 | Matthews | Oct. 23, 1956 |
| 2,851,789 | Dunkelman | Sept. 16, 1958 |
| 2,867,430 | Hullar | Jan. 6, 1959 |
| 2,911,810 | Lantz et al. | Nov. 10, 1959 |

Notice of Adverse Decision in Interference

In Interference No. 95,084 involving Patent No. 3,045,993, N. J. Sidaris, DRYER CONTROL SYSTEM, final judgment adverse to the patentee was rendered Mar. 26, 1968, as to claims 1-10.

[*Official Gazette August 20, 1968.*]